(12) United States Patent
Berner et al.

(10) Patent No.: US 10,099,123 B2
(45) Date of Patent: *Oct. 16, 2018

(54) METHOD AND APPARATUS FOR MANAGING A GAMING APPLICATION

(71) Applicant: AT&T INTELLECTUAL PROPERTY I, L.P., Atlanta, GA (US)

(72) Inventors: Earl Berner, Wylie, TX (US); Martha Aldaco, Garland, TX (US); Tasos Kaiafas, McKinney, TX (US); Gregory Skasko, Irving, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 118 days.

This patent is subject to a terminal disclaimer.

(21) Appl. No.: 15/253,304

(22) Filed: Aug. 31, 2016

(65) Prior Publication Data

US 2016/0367894 A1    Dec. 22, 2016

Related U.S. Application Data

(63) Continuation of application No. 14/688,460, filed on Apr. 16, 2015, now Pat. No. 9,457,271, which is a
(Continued)

(51) Int. Cl.
*A63F 9/24* (2006.01)
*A63F 13/26* (2014.01)
*A63F 13/216* (2014.01)
*A63F 13/77* (2014.01)
*A63F 13/335* (2014.01)
(Continued)

(52) U.S. Cl.
CPC ............. *A63F 13/26* (2014.09); *A63F 13/12* (2013.01); *A63F 13/213* (2014.09); *A63F 13/216* (2014.09); *A63F 13/2145* (2014.09); *A63F 13/31* (2014.09); *A63F 13/327* (2014.09); *A63F 13/335* (2014.09); *A63F 13/338* (2014.09); *A63F 13/352* (2014.09); *A63F 13/355* (2014.09); *A63F 13/77* (2014.09); *A63F 2300/205* (2013.01); *A63F 2300/407* (2013.01); *A63F 2300/409* (2013.01);
(Continued)

(58) Field of Classification Search
USPC ......................................................... 463/42
See application file for complete search history.

(56) References Cited

U.S. PATENT DOCUMENTS 7,824,268 B2   11/2010   Harvey
7,848,765 B2   12/2010   Phillips
(Continued)

*Primary Examiner* — Masud Ahmed
(74) *Attorney, Agent, or Firm* — Guntin & Gust, PLC; Joseph Hrutka

(57) ABSTRACT

An embodiment of the present disclosure includes, for example, a method for receiving from a first device a request to initiate a video game with a second device, determining a location of the first device, detecting a difference between first computing resources of the first device and second computing resources of the second device, instructing the first device, the second device, or both to adjust a resource configuration to mitigate an aspect of the difference between the first computing resources and the second computing resources, and coordinating an exchange of first control information provided by the first device and second control information provided by the second device to enable a multiplayer session of the video game between the first device and the second device. Other embodiments are disclosed.

20 Claims, 6 Drawing Sheets

Related U.S. Application Data continuation of application No. 14/168,354, filed on Jan. 30, 2014, now Pat. No. 9,022,857, which is a continuation of application No. 13/669,609, filed on Nov. 6, 2012, now Pat. No. 8,678,915, which is a continuation of application No. 13/098,567, filed on May 2, 2011, now Pat. No. 8,348,752.

(51) Int. Cl.
| | |
|---|---|
| *A63F 13/355* | (2014.01) |
| *A63F 13/352* | (2014.01) |
| *A63F 13/338* | (2014.01) |
| *A63F 13/31* | (2014.01) |
| *A63F 13/30* | (2014.01) |
| *A63F 13/213* | (2014.01) |
| *A63F 13/2145* | (2014.01) |
| *A63F 13/327* | (2014.01) |

(52) U.S. Cl.
CPC ... *A63F 2300/513* (2013.01); *A63F 2300/535* (2013.01); *A63F 2300/538* (2013.01)

(56) References Cited

U.S. PATENT DOCUMENTS

| | | |
|---|---|---|
| 2002/0034980 A1 | 3/2002 | Lemmons |
| 2006/0270421 A1 | 11/2006 | Phillips |
| 2007/0111794 A1 | 5/2007 | Hogan |
| 2008/0201283 A1 | 8/2008 | Fitzpatrick |
| 2011/0059729 A1 | 3/2011 | Simon |
| 2012/0011189 A1 | 1/2012 | Werner |
| 2012/0079080 A1 | 3/2012 | Pishevar |
| 2012/0108320 A1 | 5/2012 | Ye |

# METHOD AND APPARATUS FOR MANAGING A GAMING APPLICATION

CROSS-REFERENCE TO RELATED APPLICATIONS

This application is a continuation of U.S. patent application Ser. No. 14/688,460, now U.S. Patent Publication No. 2015/0217182, which is a continuation of U.S. patent application Ser. No. 14/168,354, now U.S. Pat. No. 9,022,857, which is a continuation of U.S. patent application Ser. No. 13/669,609, now U.S. Pat. No. 8,678,915, which is a continuation of U.S. patent application Ser. No. 13/098,567, now U.S. Pat. No. 8,348,752. The contents of each of the foregoing is/are hereby incorporated by reference into this application as if set forth herein in full.

FIELD OF THE DISCLOSURE

The present disclosure relates generally to gaming applications and more specifically to a method and apparatus for managing a gaming application.

BACKGROUND

Gaming consoles today support multiplayer games which can be played from a single gaming console, or between gaming consoles located in remote locations when players are subscribed to online gaming services. Smart phones are also adapted to download games which users can play individually from their smart phone or between users of smart phones over a wireless communication system.

DETAILED DESCRIPTION

Figure 1:
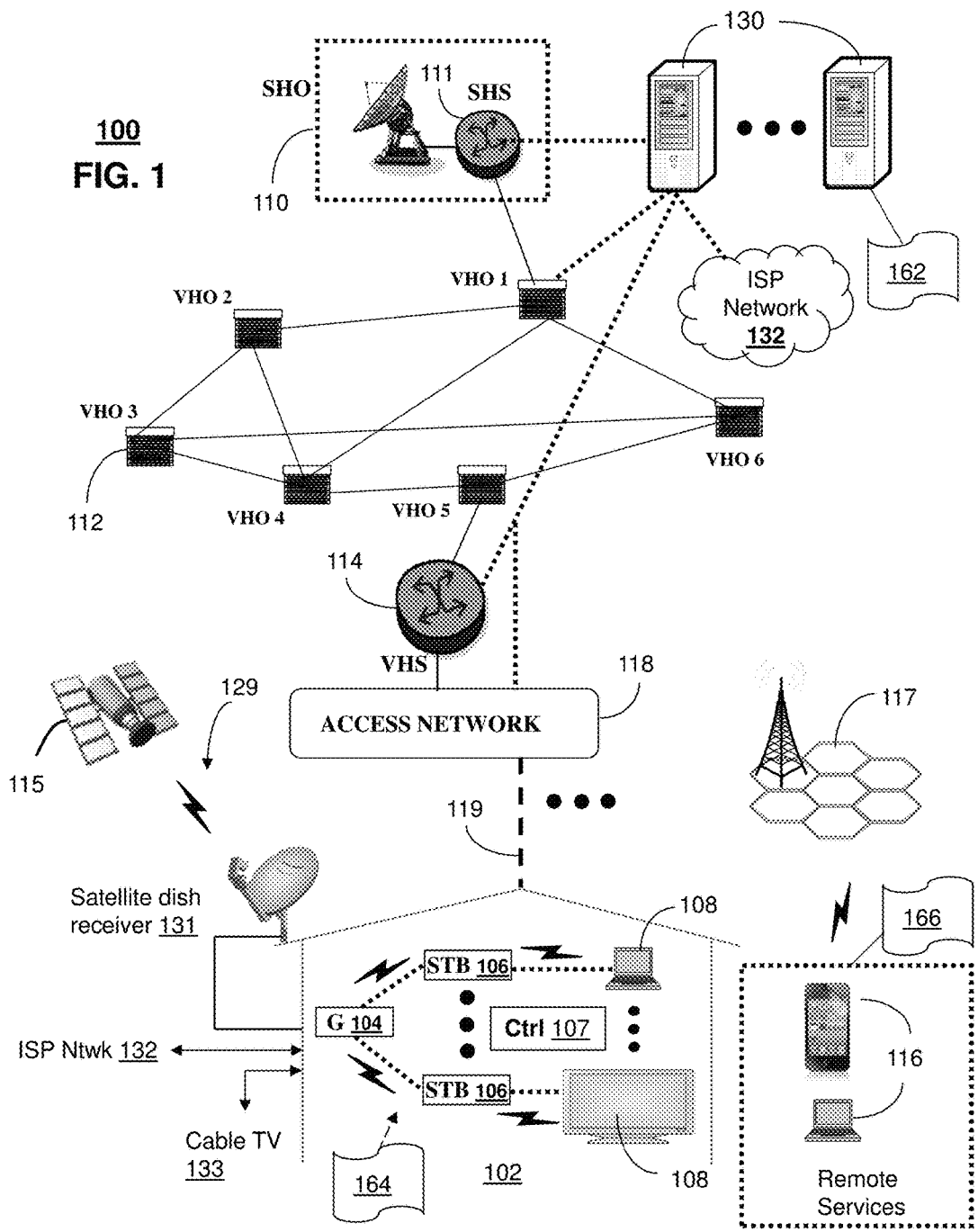
FIGS. 1-2 depict illustrative embodiments of communication systems that provide media services.

The present disclosure describes, among other things, illustrative embodiments of a system for enabling gaming applications at one or more communication devices. Other embodiments are contemplated by the present disclosure.

One embodiment of the present disclosure includes a computer-readable storage medium in a coordination server having computer instructions to receive from a communication device a request to initiate a video game with at least one device remotely located from the communication device, determine a location of the communication device, select a game rendering server from a plurality of game rendering servers according to the location of the communication device, and instruct the game rendering server to transmit a video stream associated with the video game responsive to determining that the communication device is unable to execute in whole or in part the video game from local computing resources of the communication device. The computer-readable storage medium can further include computer instructions to receive first control information generated by the communication device, receive second control information generated by the at least one device, and coordinate an exchange of the first control information and the second control information to enable a multiplayer game of the video game between the communication device and the at least one device.

One embodiment of the present disclosure includes a method for receiving a request to coordinate execution of a gaming application between a communication device and at least one device remotely located from the communication device, selecting a game rendering server from a plurality of game rendering servers according to a determination of at least one characteristic of the communication device, and instructing the game rendering server to transmit a stream associated with the gaming application responsive to determining that the communication device is unable to execute in whole or in part the gaming application from local computing resources of the communication device. The method can further include receiving first control information generated by the communication device, receiving second control information generated by the at least one device, and coordinating an exchange of the first control information and the second control information between the communication device and the at least one device.

One embodiment of the present disclosure includes a rendering server having a memory, and a processor coupled to the memory. The processor can be adapted to receive instructions from a coordination server to transmit to a communication device a stream associated with a gaming application responsive to a determination by the coordination server that the communication device is unable to process in whole or in part the gaming application from local computing resources of the communication device, and transmit the stream to the communication device. The processor can further be adapted to receive from the coordination server first control information and second control information, where the first control information is generated by the communication, where the second control information is generated by at least one device, and where the coordination server is adapted to coordinate an exchange of the first control information and the second control information to enable a multiplayer game between the communication device and the at least one device.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can also be used in the media system of FIG. 1. The satellite broadcast television system 129 can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Several forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wireless network technologies are contemplated by the present disclosure.

Communication system 100 can also provide for all or a portion of the computing devices 130 to function as a coordination server (herein referred to as coordination server 130). The coordination server 130 can use common computing and communication technology to perform function 162, which includes among other things, coordinating a gaming session between communication devices, selecting a rendering server to assist a communication device with limited resources, and to control the exchange of gaming control information in a multiplayer setting. Communication devices such as references 106 and 116 can utilize gaming software applications to perform gaming functions 164 and 166 as will be described below.

Figure 6:
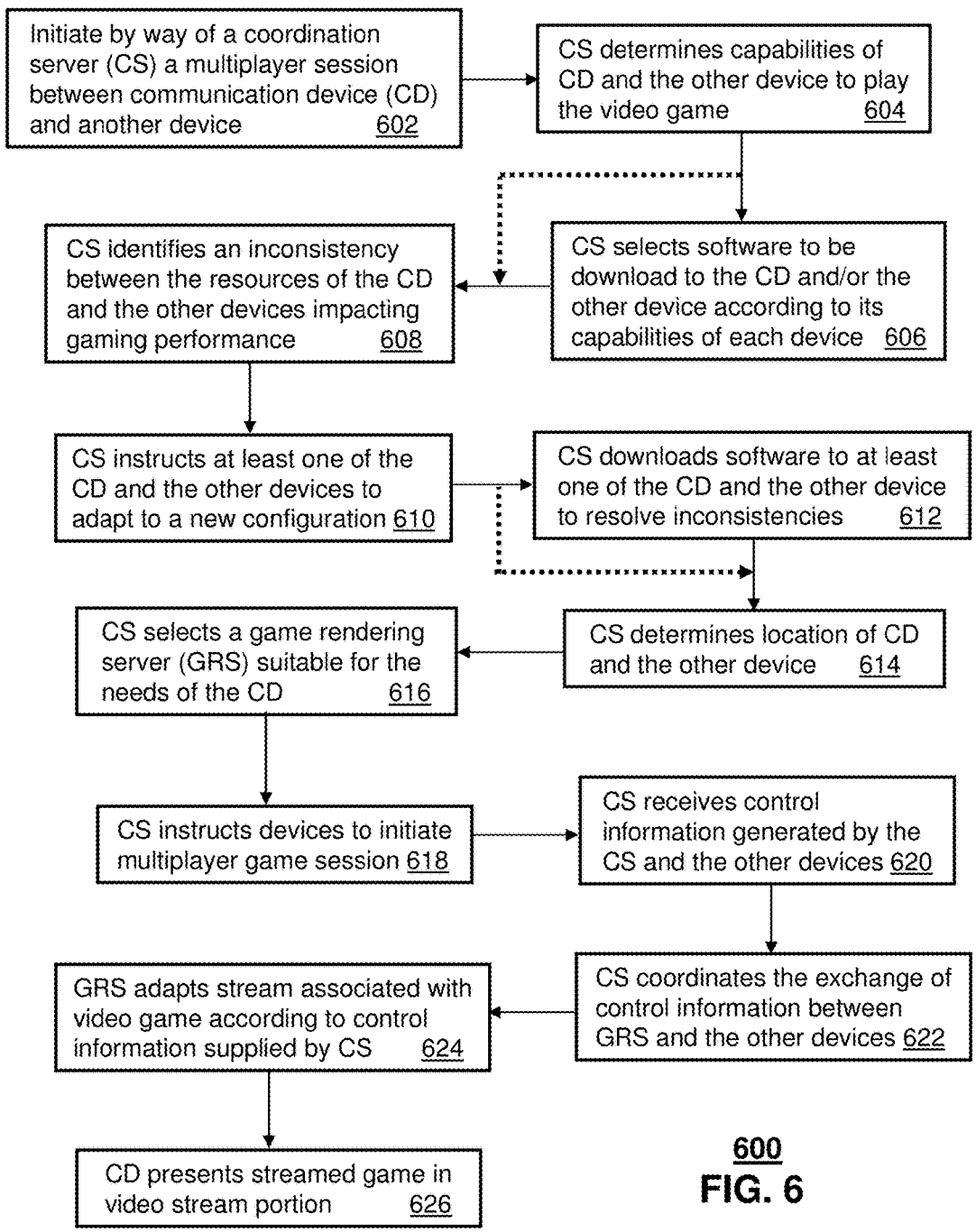
FIG. 6 depicts an illustrative embodiment of a method operating in portions of the systems described in FIGS. 1-5.

Illustrative embodiments of method 600 shown in FIG. 6 can be applied to portions of the devices of FIG. 1.

Figure 2:
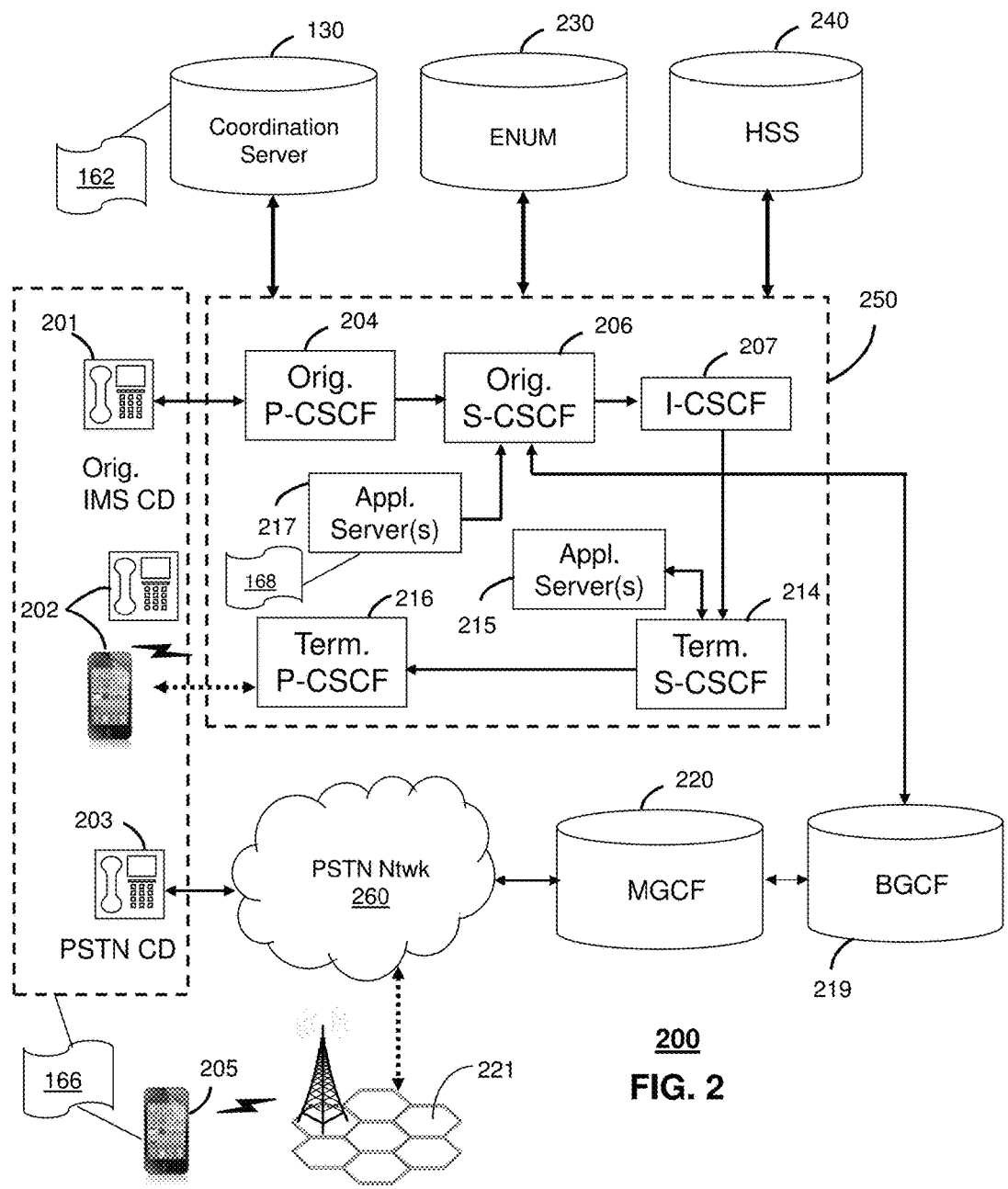

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250.

The coordination server 130 of FIG. 1 can be operably coupled to the second communication system 200 for purposes similar to those described above. It is further contemplated by the present disclosure that coordination server 130 can perform function 162 and thereby provide gaming services to the CDs 201-203 and 205 in FIG. 2 executing gaming software that performs gaming function 166. The coordination server 130 can also select an application server 217 to perform game rendering functions for CDs 201-203 and 205.

Illustrative embodiments of method 600 shown in FIG. 6 can be applied to portions of the devices of FIG. 2.

Figure 3:
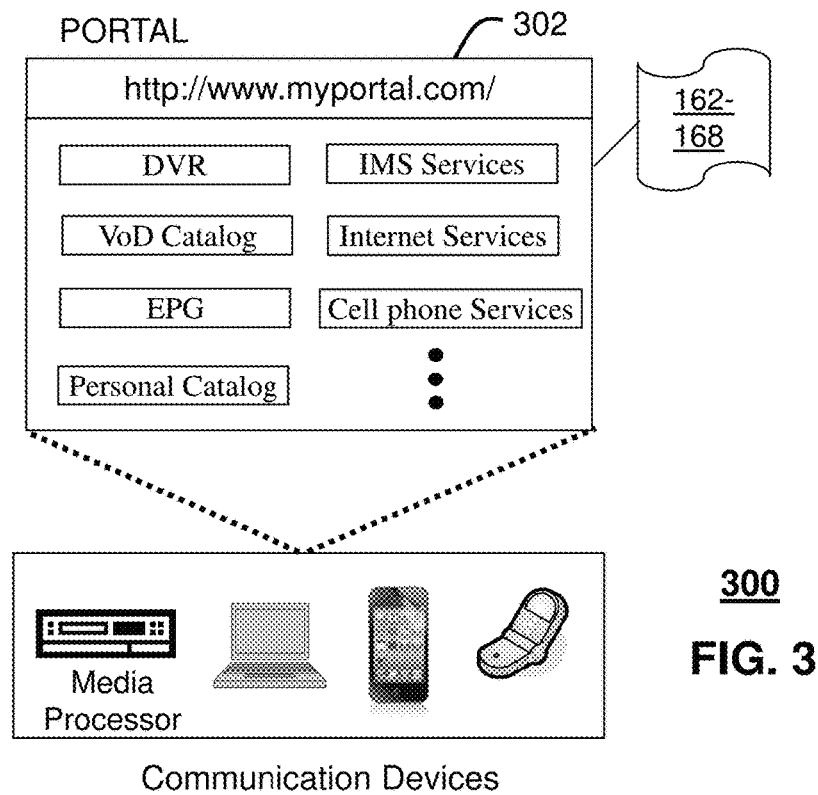
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162, 164, 166 and 168.

Figure 4:
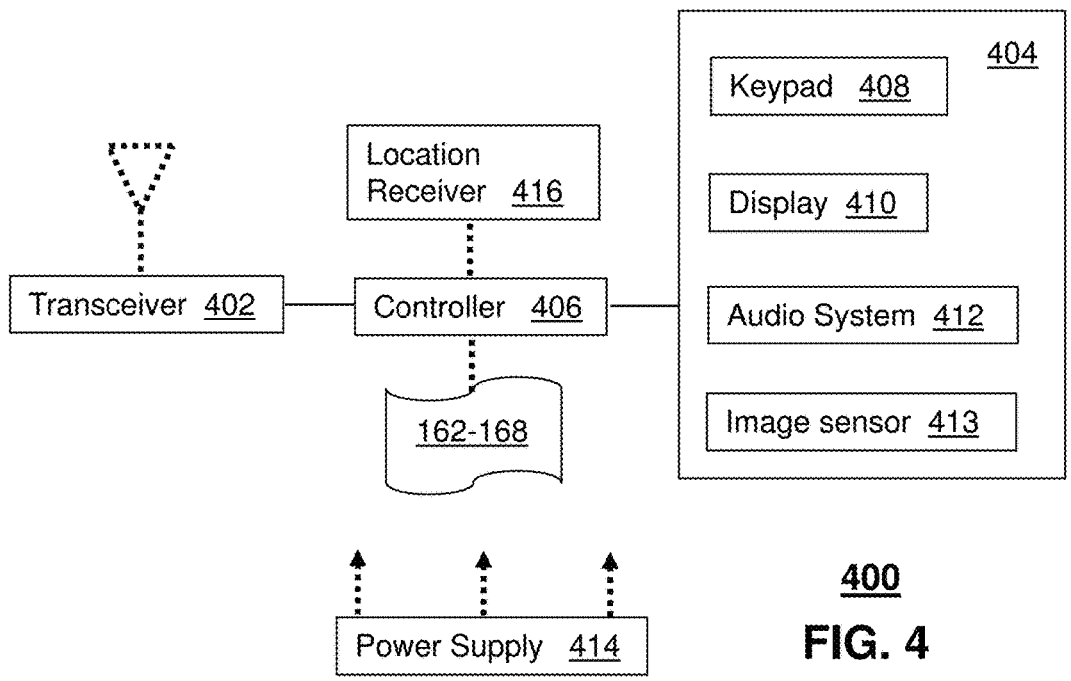
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is further contemplated by the present disclosure that the communication device 400 can operate as a coordination server, rendering server, or a mobile communication device. The controller 406 can be adapted in various embodiments to perform the functions 162, 164, 166 and 168 of any of the aforementioned devices. Illustrative embodiments of method 600 shown in FIG. 6 can be applied to portions of the communication device 400 of FIG. 4.

Figure 5:
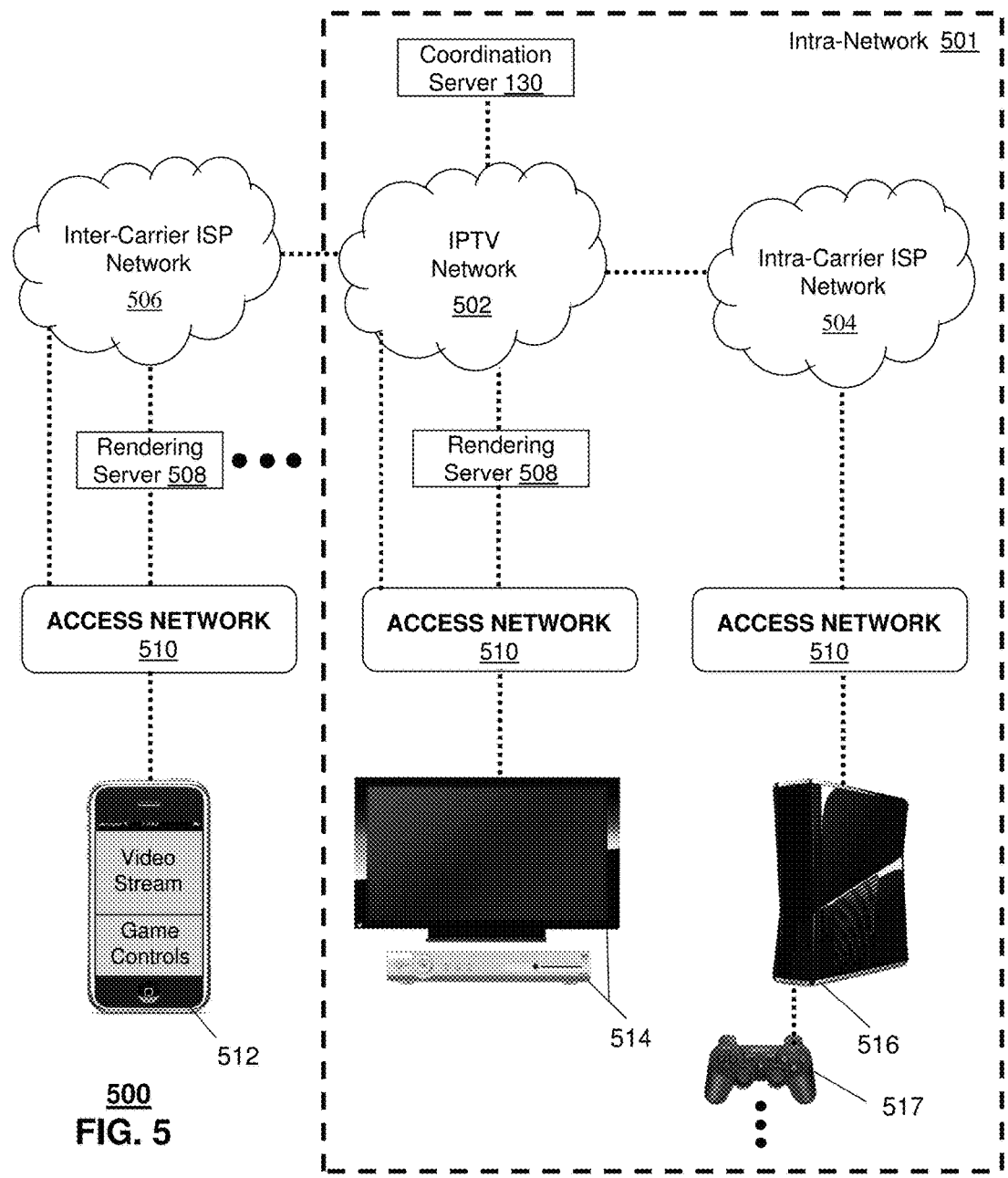
FIG. 5 depicts an illustrative embodiment of a system for enabling gaming applications between devices.

FIG. 5 depicts an illustrative embodiment of a system 500. System 500 can comprise a coordination server 130 communicatively coupled to an IPTV network 502. The IPTV network 502 can be communicatively coupled to an Intra-Carrier ISP network 504 and/or an Inter-Carrier ISP network 506. The Intra-carrier ISP 504 can represent an ISP network that is managed by the same service provider of the IPTV network 502 and the coordination server 130 (referred herein as service provider A). The IPTV network 502 and Intra-carrier ISP network 504 can be configured by the coordination server 130 to provide preferred services to subscribers of the service provider A. The Inter-carrier ISP 506 can represent an ISP network managed by a service provider (herein service provider B) which may have an inter-carrier agreement with service provider A to share Internet services with service provider A.

By way of the inter-carrier ISP 506, the IPTV network 502 of service provider A may access subscriber devices roaming in other networks as well as rendering servers 508 which may be called on by the IPTV network 502 to provide gaming services to mobile devices 512 by way of an access network 510. The access network 510 can represent a landline access network with DSLAMs, or an access network with base stations that provide WiFi, WiMAX, or cellular communication services to mobile devices.

The IPTV network 502 may also access set-top box 514 by way of an access network 510 located within service provider A's communication system. The IPTV network 502 can also access a rendering server 508 to render gaming services to the set-top box 514 by way of access network 510. Additionally, the IPTV network 502 can access a gaming console 516 by way of a combination of the intra-carrier ISP network 504 and the access network 510.

The coordination server 130 can be adapted to coordinate a gaming session between communication devices 512, 514 or 516, to select a rendering server 508 to assist a communication device with limited resources such as 512 or 514, and to control the exchange of gaming control information in a multiplayer setting.

FIG. 6 depicts an illustrative method 600 that operates in portions of the devices of FIGS. 1-5. Method 600 can begin with step 602 in which the coordination server 130 initiates a multiplayer session between a communication device and at least one other device. This step can result from a request submitted by a user of one of the gaming devices. Suppose, for example, that the user of a mobile device 512 in FIG. 5 is interested in initiating a multiplayer game. The user can invoke an application in the mobile device 512 that submits a message by way of the Inter-carrier ISP network 506, which is then forwarded to the coordination server 130 by way of the IPTV network 502. The request submitted by the mobile device 512 can identify a multiplayer game to be initiated with a user (gamer) of the gaming console 516 and the game that is to be played between these devices. In step 604, the coordination server 130 can determine the capabilities of the mobile device 512 and the gaming console 516. If one or both of these devices require software to engage in the multiplayer game, the coordination server 130 can download this software.

The software downloaded in step 606 can represent software corresponding to the desired game in whole or in part. If the mobile device 512 is not capable of executing the game locally, the software downloaded to the mobile device 512 can represent a user interface for controlling the game as it is streamed from a rendering server 508. The software when invoked in the mobile device 512 can, for example, segment a portion of the display for gaming controls and a portion for presenting a video stream corresponding to the game as shown in FIG. 5. If the gaming console 516 is able to execute the game locally but does not have a copy of the game, the coordination server 130 can download a full version of the game to the gaming console 516. The full game can include versioning schemes of the game to accommodate a variable suite of features to enable equitable game sessions as will be discussed below. If the gaming software is available in either device, the coordination server 130 can skip step 606 and proceed to step 608.

At step 606, the coordination server 130 can identify inconsistencies between the resources of the mobile device 512 and the gaming console 516, and determine that an unmitigated inconsistency may impact the gaming performance of either player of such devices. For example, the coordination server 130 may determine that the player using the gaming console 516 has an unfair advantage over the player with the mobile device 512 because the touch-screen gaming controls of the mobile device 512 are less sophisticated than the controls of a gaming controller 517 used with the gaming console 516. The coordination server 130 may also determine that the response time of the touch-screen gaming controls may be noticeably slower than the gaming controls of the gaming controller 517 of the gaming console 516. Similarly, the coordination server 130 may determine that the mobile device 516 has an accelerometer and/or gyroscope that provide three dimensional controls that the gaming controller 517 of the gaming console 516 does not have. The coordination server 130 may also determine other discrepancies between the mobile device 512 and the gaming console 516 such as disparate display resolutions, disparate screen sizes, disparate aspect ratios, disparate audio quality, and so on. The coordination server 130 can determine from these operational differences which features of each device may provide an unfair advantage to one player over another.

In step 610, the coordination server 130 can mitigate these differences in whole or in part by instructing the mobile device 512 and the gaming console 516 to each adapt to a new operational configuration. The new configuration can result in the deliberate degrading of performance or disabling of one or more features in each device. In one embodiment, the coordination server 130 can, for example, instruct the gaming console to execute one of a plurality of versions of the gaming software stored in a memory of the gaming console 516 in order to be feature-wise compatible with the mobile device 512. The selected software version can represent a version that is known to be compatible with the mobile device 512. In another embodiment, the coordination server 130 can download a version of the gaming software that is feature-wise compatible with the mobile device 512 if a desired software version is not already available in the gaming console 512.

In one embodiment, the coordination server 130 can instruct the mobile device 512 and/or the gaming console 516 to downgrade or alter one or more features such as resolution, accelerometer/gyro, input response time, audio quality, display aspect ratio, and so on. In one embodiment, the coordination server 130 can also download software to the mobile device 512 and/or the gaming console 516 to resolve inconsistencies. The software can represent a patch, a replacement or update of a version of the gaming software, or combinations thereof. If inconsistencies can be resolved by provisioning the mobile device 512 and/or the gaming console 516, then step 612 can be skipped. Instead a provisioning step (not shown) can be applied to adjust features in the mobile device 512 and gaming console 516 to mitigate game performance inconsistencies.

At step 614, the coordination server 130 can be adapted to also determine the location of the mobile device 512 and the gaming console 516, and whether these devices are operating within the intra-network 501. Since the gaming console 516 is within the intra-network 501, the coordination server 130 can manage the IPTV Network 502 and/or the Intra-Carrier ISP 504 to provide the gaming console 516 adequate services to engage in the requested gaming session. Furthermore, since the gaming console 516 can execute the gaming software locally, the coordination server 130 can determine that it does not have to provide rendering services. In the illustration of FIG. 5, it is assumed that the mobile device 512 is roaming in a network that is not within the intra-network 501. It is further assumed in this illustration that the mobile device 512 can execute the gaming controls locally, but does not have the ability to render the visual portion of the game without assistance.

Under these circumstances, the coordination server 130 can proceed to step 616 where it selects a game rendering server 508 that can provide rendering services to the mobile device 512. The coordination server 130 can select the game rendering server 508 based on a proximity of the game rendering server 508 to the location of the mobile device 512, and the capabilities of the mobile device 512 determined in steps 614 and 604. Other factors can be considered by the coordination server 130 in the selection process such as the availability and capacity of other game rendering servers 508 (not shown, but inferred by the adjacent dots) coupled to the inter-carrier ISP 506 network, and the limitations of the inter-carrier ISP 506 to provide reliable data services to the mobile device 512 from one of the available game rendering servers 508.

Once a game rendering server 508 has been selected, the coordination server 130 can instruct at step 618 the game rendering server 508 to execute gaming software corresponding to the game requested in step 602. Once the gaming software has been executed, the coordination server 130 can nearly contemporaneously instruct the mobile device 512 and the gaming console 516 to initiate the multiplayer game session in the same step. At step 620, the coordination server 130 can receive control information generated by the gamer of the mobile device 512 and the gamer(s) of the gaming console 516. A portion of the control information can result from the gamer of the mobile device 512 manipulating the gaming controls on the display of the mobile device 512 and/or manipulating the mobile device 512 in 3D space which causes the built-in accelerometer and/or gyro to generate control information. The other portion of the control information can come from gamer(s) manipulating one or more gaming controllers 517 communicatively coupled to the gaming console 516 as shown in FIG. 5.

In step 622, the coordination server 130 can coordinate the exchange of control information between the game rendering server 508 and the gaming console 512. Since the mobile device 512 does not execute gaming software (other than a user interface for gaming controls) the control information generated by the gaming controller 517 associated with the game console 516 is directed by the coordination server 130 to the game rendering server 508 to cause the game to transition to other gaming states according to the control information (game stimuli) produced by the gaming controller(s) 517. Once the game has been updated according to the game stimuli produced by the gaming controller(s) 517, the gaming rendering server 508 can stream in step 624 the updated video game to the mobile device 512. Upon receipt of the streamed data, the mobile device 512 can present the streamed video in the allotted portion of the display. The streamed content can also include the updated audio portion of the game which can be presented to the gamer by way of the speaker of the mobile device 512, or a tethered or wireless (e.g., Bluetooth) headset.

Method 600 can be applied to communication devices of disparate types to enable them to engage in a multiplayer game session independent of location, and rendering resources of each device. Method 600 can also be applied to mitigate gaming performance inconsistencies caused by dissimilar resources of communication devices.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted for a mobile device to mobile device gaming session, a mobile device to set-top gaming session, a gaming console to set-top box gaming session, a set-top box to computer gaming session, as well as other suitable combinations. Additionally, method 600 can be adapted for gaming sessions involving audio-only games with no video component, and vice-versa. In another embodiment, method 600 can be adapted for 3D gaming sessions. Thus, method 600 can be applied to any device with computing resources capable of engaging in a gaming session involving any suitable form of media content. Other embodiments are contemplated by the present disclosure.

Figure 7:
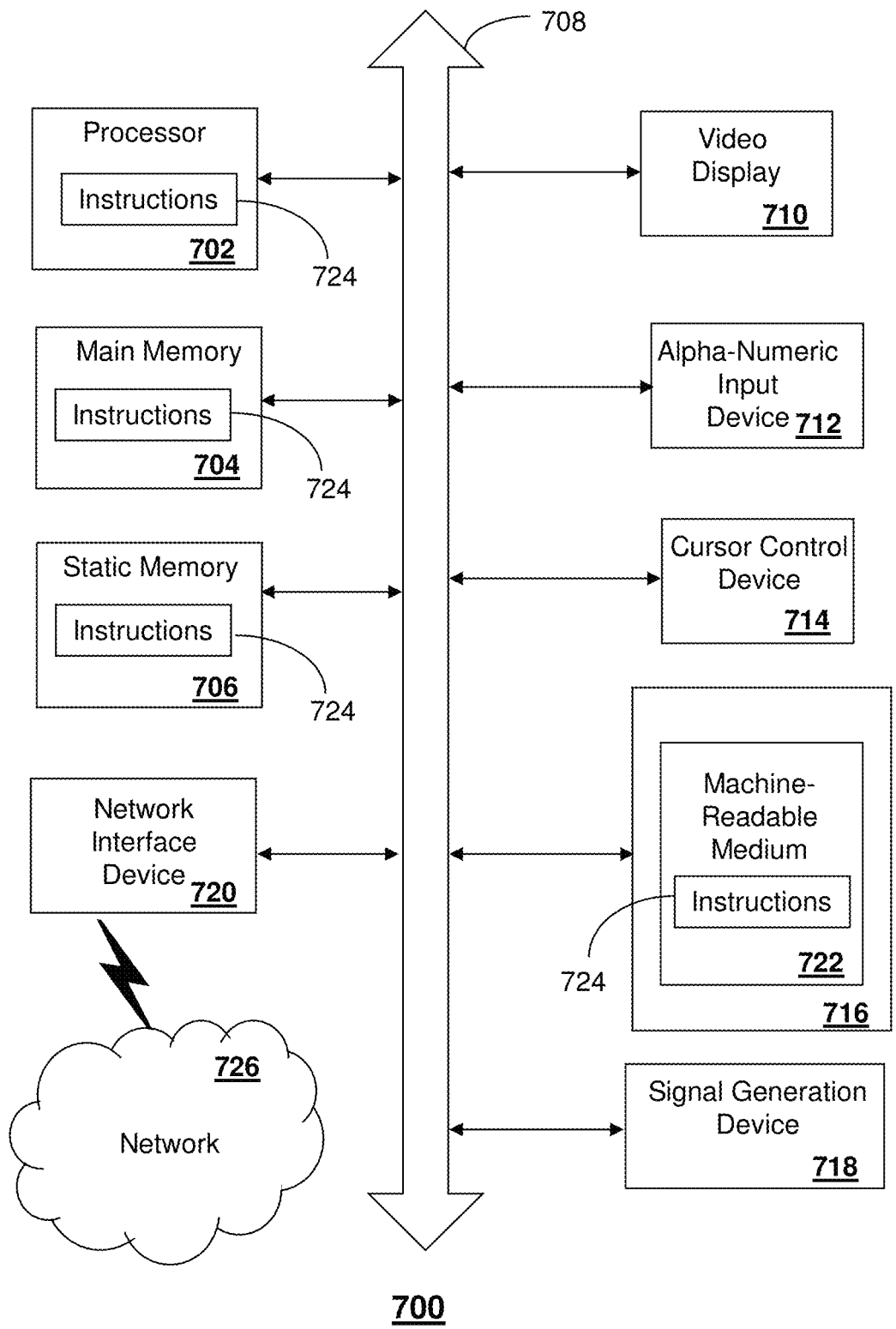
FIG. 7 is a diagrammatic representation of a machine in the form of a computer system within which a set of instructions, when executed, may cause the machine to perform any one or more of the methods discussed herein.

FIG. 7 depicts an exemplary diagrammatic representation of a machine in the form of a computer system 700 within which a set of instructions, when executed, may cause the machine to perform any one or more of the methods discussed above. One or more instances of the machine can operate, for example, as coordination server 130, a game rendering server 508, a mobile device 512, a set-top box 514, a gaming console 516, or other suitable devices capable of engaging in a game session. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A machine-readable storage medium, comprising executable instructions that, when executed by a processing system including a processor, facilitate performance of operations, comprising:
   detecting a difference between a first performance of a first device and a second performance of a second device, the difference being detected responsive to a request to initiate a video game by both the first device and the second device;
   instructing the first device and the second device to adjust a first performance configuration and second performance configuration to mitigate the difference between the first performance and the second performance, wherein a mitigation of the difference between the first and second performances is based on the instructing of the first and second devices causing a degradation of one of the first or second performances; and
   coordinating an exchange of first control information provided by the first device and second control information provided by the second device to enable a multiplayer session of the video game between the first device and the second device.

2. The machine-readable storage medium of claim 1, wherein the difference between the first performance and the second performance is a difference in a presentation by a first display device of the first device and a presentation by a second display device of the second device.

3. The machine-readable storage medium of claim 2, wherein the presentation by the first and second display devices includes images captured by cameras of the first and second devices.

4. The machine-readable storage medium of claim 2, wherein the difference between the presentations by the first and second display devices is a difference in a screen size difference, a display resolution, a touch screen capability, a display aspect ratio, or a combination thereof.

5. The machine-readable storage medium of claim 1, wherein the difference between the first performance and the second performance is a difference in network latency being experienced by the first device and being experienced by the second device.

6. The machine-readable storage medium of claim 1, wherein the difference between the first performance and the second performance is a difference in a capacity of three dimensional controls between the first device and the second device.

7. The machine-readable storage medium of claim 1, wherein the difference between the first performances and the second performances is a difference in a capacity of a touch screen control between the first device and the second device.

8. The machine-readable storage medium of claim 1, wherein the second control information comprises modified control information generated by the second device responsive to receiving instructions to adjust the second performance configuration.

9. A method, comprising:
   providing, to first and second devices by a processing system including a processor, instructions to adjust a performance configuration to reduce a difference between a first performance parameter of the first device and a second performance parameter of a second device, wherein the difference is detected responsive to a request associated with a gaming session that is associated with the first and second devices; and
   coordinating, by the processing system, an exchange of first control information provided by the first device and second control information provided by the second device to enable the gaming session between the first device and the second device.

10. The method of claim 9, wherein the difference between the first performance parameter and the second performance parameter is a difference in a performance by a first display device of the first device and a performance by a second display device of the second device.

11. The method of claim 10, wherein the performance by the first and second display devices includes images captured by cameras of the first and second devices.

12. The method of claim 10, wherein the difference between the first display device and the second display device is a difference in a screen size difference, a display resolution, a touch screen capability, a display aspect ratio, or a combination thereof.

13. The method of claim 9, wherein the difference between the first performance parameter and the second performance parameter is a difference in a capacity of a touch screen control between the first device and the second device.

14. The method of claim 9, wherein an adjusting of the performance configuration of the first device, the second device or both reduces an advantage to play a video game of the gaming session at the first device or the second device.

15. A device, comprising:
   a processing system including a processor; and
   a memory that stores executable instructions that, when executed by the processing system, facilitate performance of operations, comprising:
      transmitting, to a first communication device, a stream associated with a gaming application responsive to a determination that the first communication device lacks a resource to locally initiate the gaming application; and
      receiving first control information and second control information, wherein the first control information is generated by the first communication device, wherein the second control information is generated by a second communication device to enable a multiplayer game between the first communication device and the second communication device, and wherein the first communication device, the second communication device, or both are instructed to change a resource configuration to mitigate a detected difference between a first gaming performance of the first communication device and a second gaming performance of the second communication device.

16. The device of claim 15, wherein the operations further comprise modifying the gaming application to mitigate an advantage to play the gaming application for one of the first communication device and the second communication device.

17. The device of claim 15, wherein the detected difference between the first gaming performance and the second gaming performance is a difference in a first display device of the first communication device and a second display device of the second communication device.

18. The device of claim 15, wherein the detected difference between the first gaming performance and the second gaming performance is a difference in a screen size difference, a display resolution, a touch screen capability, a display aspect ratio, or a combination thereof.

19. The device of claim 15, wherein the detected difference between the first gaming performance and the second gaming performance is a difference in a capacity of three dimensional controls between the first communication device and the second communication device.

20. The device of claim 15, wherein the detected difference between the first gaming performance and the second gaming performance is a difference in a capacity of a first controller and a second controller between the first communication device and the second communication device.

* * * * *